(12) United States Patent  
Mo

(10) Patent No.: US 8,973,987 B2  
(45) Date of Patent: Mar. 10, 2015

(54) CHILD SAFETY SEAT

(71) Applicant: BP Children's Products HK Co., Limited, Kowloon (HK)

(72) Inventor: Xiao Long Mo, Kowloon (HK)

(73) Assignee: BP Children's Products HK Co., Ltd., Hong Kong (HK)

( * ) Notice: Subject to any disclaimer, the term of this patent is extended or adjusted under 35 U.S.C. 154(b) by 0 days.

(21) Appl. No.: 13/928,494

(22) Filed: Jun. 27, 2013

(65) Prior Publication Data

US 2014/0001800 A1     Jan. 2, 2014

(30) Foreign Application Priority Data

Jun. 28, 2012 (CN) .......................... 2012 1 0217524

(51) Int. Cl.
*B60N 2/28* (2006.01)

(52) U.S. Cl.
CPC ............ *B60N 2/2884* (2013.01); *B60N 2/2824* (2013.01)
USPC .............. 297/216.11; 297/216.2; 297/256.16; 297/463.1

(58) Field of Classification Search
CPC .................................................. B60N 2/2884
USPC .................. 297/216.11, 216.2, 256.16, 463.1
See application file for complete search history.

(56) References Cited

U.S. PATENT DOCUMENTS

| | | | |
|---|---|---|---|
| 4,720,139 A * | 1/1988 | McSmith | 297/216.2 |
| 5,685,603 A | 11/1997 | Lane, Jr. | |
| 7,070,236 B2 * | 7/2006 | Kawashima | 297/216.1 X |
| 7,407,226 B2 | 8/2008 | Macliver | |
| 7,753,445 B2 * | 7/2010 | Kassai et al. | 297/256.16 |
| 8,226,163 B1 * | 7/2012 | Pearson et al. | 297/216.2 X |
| 2004/0183344 A1 * | 9/2004 | Glance et al. | 297/216.1 |
| 2008/0303321 A1 * | 12/2008 | Powell | 297/216.11 |

FOREIGN PATENT DOCUMENTS

| | | |
|---|---|---|
| DE | 4312343 C2 | 1/1997 |
| DE | 19756252 A1 | 7/1998 |
| DE | 19946056 A1 | 3/2001 |
| DE | 10047790 A1 | 3/2002 |
| DE | 102007056373 A1 | 5/2009 |
| EP | 2230125 A1 | 9/2010 |
| FR | 2864482 A1 | 7/2005 |
| GB | 2495619 A | 4/2013 |
| WO | 2005108155 A2 | 11/2005 |
| WO | 2006021749 A1 | 3/2006 |

* cited by examiner

*Primary Examiner* — Anthony D Barfield
(74) *Attorney, Agent, or Firm* — David I. Roche; Baker & McKenzie LLP

(57) ABSTRACT

A child safety seat includes a seat base having shell body, and a support leg connected with the shell body. The support leg includes a tubular segment, a support portion, a fastener connected with the tubular segment and the support portion, and a cushioning structure disposed adjacent to the fastener, wherein the cushioning structure is configured to block displacement of the fastener so that the support portion is locked in position relative to the tubular segment, and to deform or break as a result of a displacement of the fastener into the cushioning structure when a substantial force is applied that forces the tubular segment to move relative to the support portion.

20 Claims, 14 Drawing Sheets

CHILD SAFETY SEAT

CROSS-REFERENCE TO RELATED APPLICATION

This patent application claims priority to Chinese Patent Application No. 201210217524.7 filed on Jun. 28, 2012, which is incorporated herein by reference.

BACKGROUND

1. Field of the Invention

The present invention relates to child safety seats.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. An anchorage fixture provided in the vehicle can securely fasten with the child safety seat, which is more adapted to provide protection for the young child.

However, when accidental collision occurs, excessive concentration of the collision energy may be transmitted from the restraint harness of the child safety seat to the body of the child. This may cause serious injury to the child.

Therefore, there is a need for a child safety seat that is safer in use, and can address at least the foregoing issues.

SUMMARY

The present application describes a child safety seat that includes a seat base having a shell body, and a support leg connected with the shell body. The support leg includes a tubular segment, a support portion, a fastener connected with the tubular segment and the support portion, and a cushioning structure disposed adjacent to the fastener, wherein the cushioning structure is configured to block displacement of the fastener so that the support portion is locked in position relative to the tubular segment, and to deform or break as a result of a displacement of the fastener into the cushioning structure when a substantial force is applied that forces the tubular segment to move relative to the support portion.

DETAILED DESCRIPTION OF THE EMBODIMENTS

Figure 2:
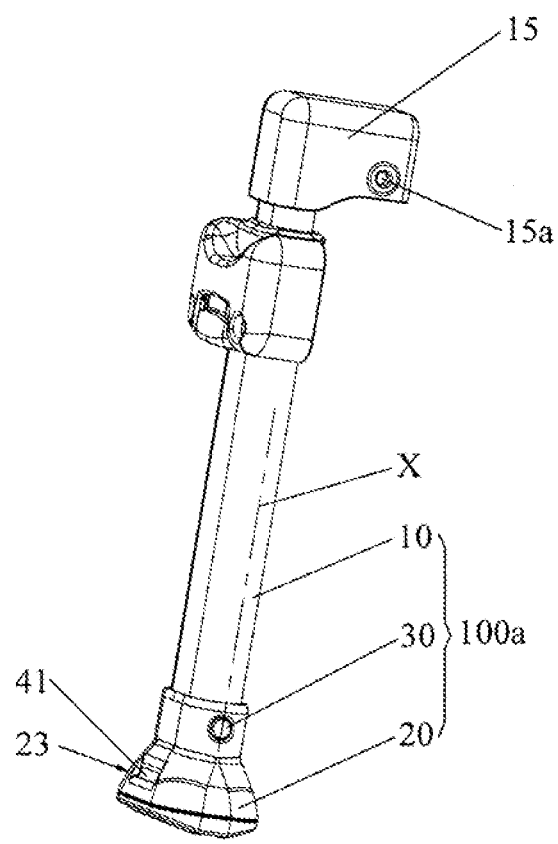
FIG. 2 is a schematic view illustrating a support leg provided in a seat base of the child safety seat.
Figure 3:
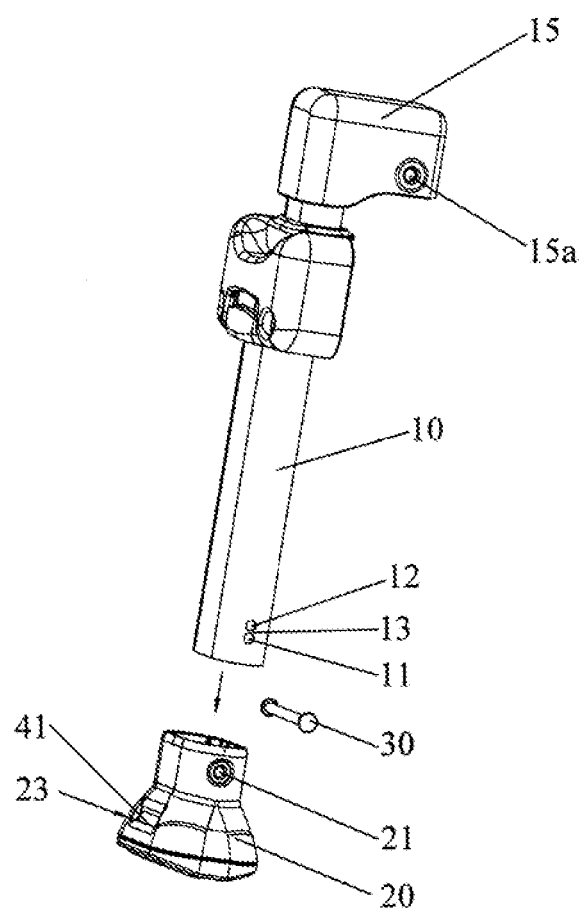
FIG. 3 is an exploded view of the support leg shown in FIG. 2.
Figure 6:
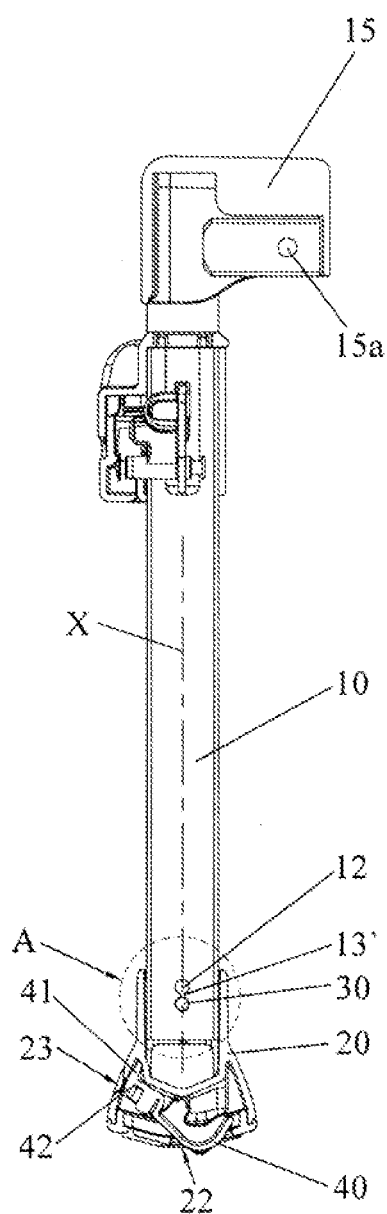
FIG. 6 is a schematic view illustrating another embodiment of a support leg suitable for use in a child safety seat.
Figure 9:
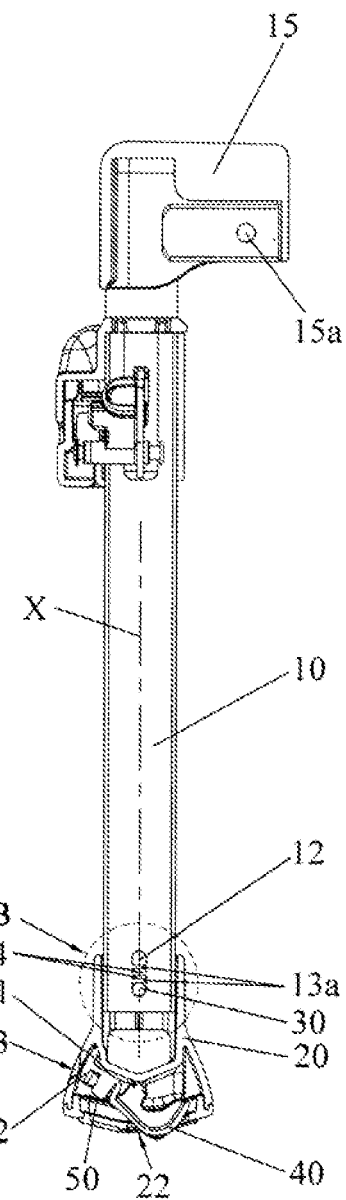
FIG. 9 is a schematic view illustrating another variant embodiment of a support leg suitable for use in a child safety seat.
Figure 12:
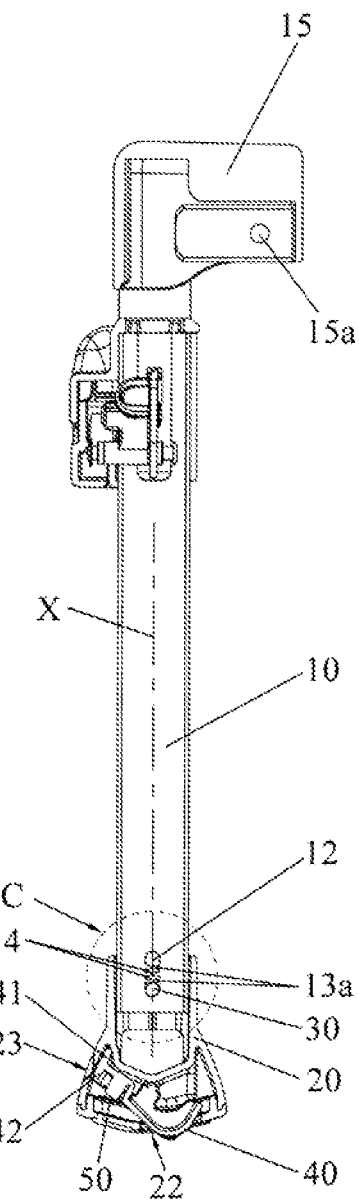
FIG. 12 is a schematic view illustrating another variant embodiment of a support leg suitable for use in a child safety seat.

The present application describes a child safety seat 1000 that can include a seat base 200, and a support leg operable to provide support for the seat base 200. Exemplary embodiments of the support leg are described in more details hereafter, including a support leg 100*a* as shown in FIG. 2, a support leg 100*b* as shown in FIG. 6, a support leg 100*c* as shown in FIG. 9, and a support leg 100*d* as shown in FIG. 12.

FIGS. 1-5 are schematic views illustrating the construction of the support leg 100*a*. The seat base 200 can have a shell body connected with the support leg 100*a*. The support leg 100*a* can include a tubular segment 10 and a foot portion 20. An upper end portion of the tubular segment 10 can be assembled with a shell body of the seat base 200. For example, the upper end portion of the tubular segment 10 can be pivotally connected with the shell body of the seat base 200 via a pivot joint 15. The tubular segment 10 can be affixed with the pivot joint 15, and the pivot joint 15 can include a hole 15*a* through which a shaft affixed with the seat base 200 can be assembled. The support leg 100*a* can be thereby operable to rotate relative to the shell body of the seat base 200 between a deployed position extending downward from the shell body for providing support, and a folded position close to the bottom of the shell body for storage.

The tubular segment 10 can extend along a lengthwise axis X of the support leg 100*a*. The tubular segment 10 can have a lower end portion fixedly assembled with the foot portion 20 via a fastener 30. For example, the tubular segment 10 can be sleeved and fitted at least partially into the foot portion 20, and the fastener 30 can engage through the tubular segment 10 and the foot portion 20. The fastener 30 can be a pin, a rivet, and like elements. The foot portion 20 can be thereby affixed with the tubular segment 10, and act as a support portion for the support leg 100*a*.

The support leg 100*a* can also include a cushioning structure that can block displacement of the fastener 30 so that the foot portion 20 is locked in position relative to the tubular segment 10, and to deform or break as a result of a displacement of the fastener 30 along the lengthwise axis X into the cushioning structure when a substantial force is applied that forces the tubular segment 10 to move relative to the foot portion 20 along the lengthwise axis X. When collision happens, a relative displacement can thus occur between the foot portion 20 and the tubular segment 10, i.e., the foot portion 20 can move relative to the tubular segment 10 within a limited range from the first position to a second position so as to dissipate a portion of the collision energy.

In one embodiment, the aforementioned cushioning structure can include two holes 11 and 12, and a cushion portion 13 interposed between the two holes 11 and 12. The two holes 11 and 12 can be formed through the tubular segment 10, and can be spaced apart from each other along the lengthwise axis X of the support leg 100a. The cushion portion 13 can be a material portion of the tubular segment 10 defined between the holes 11 and 12.

For assembling the support leg 100a, the tubular segment 10 can be partially inserted into the foot portion 20, and the fastener 30 can engage through a hole 21 of the foot portion 20 and the hole 11 of the tubular segment 10. The engagement of the fastener 30 through the holes 21 and 11 can thereby fixedly attach the tubular segment 10 with the foot portion 20, and the cushion portion 13 can block displacement of the fastener 30 from the hole 11 to the hole 12. As a result, relative displacement between the tubular segment 10 and the foot portion 20 can be prevented.

Figure 4:
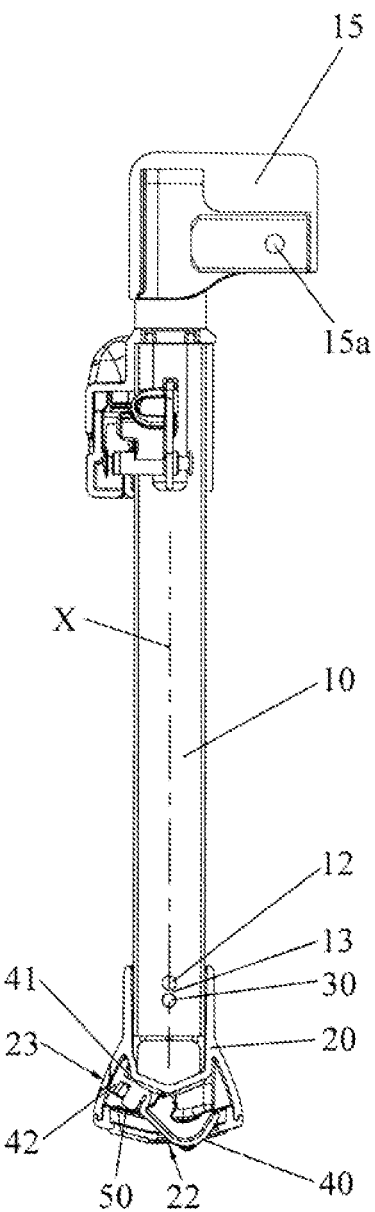
FIG. 4 is a schematic view illustrating the support leg of FIG. 2 in a normal configuration of use.
Figure 5:
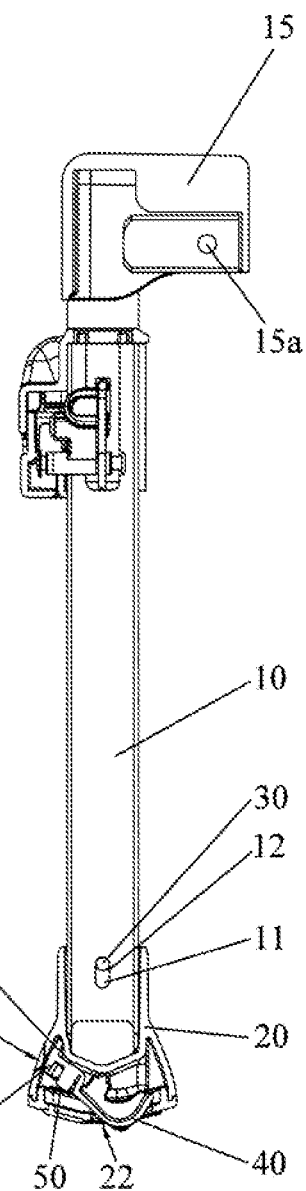
FIG. 5 is a schematic view illustrating the support leg of FIG. 2 when collision occurs.

Referring to FIGS. 4 and 5, a bottom of the foot portion 20 can include a slot 22, and a side of the foot portion 20 can include a display window 23. The foot portion 20 can also include an indicator member 40 that is assembled through an interior of the foot portion 20. The indicator member 40 can be pivotally with the foot portion 20. The indicator member 40 can upwardly extend to the display window 23, and can have an upper end portion provided with two visually distinctive regions: a first region 41 and a second region 42. In addition, the indicator member 40 can have a lower end portion that can extend outward through the slot 22 at the bottom of the foot portion 20.

The interior of the foot portion 20 can also be assembled with a spring 50 that is connected with the indicator member 40. The spring 50 can bias the indicator member 40 toward an initial position where the second region 42 is visible at the display window 23.

Figure 1:
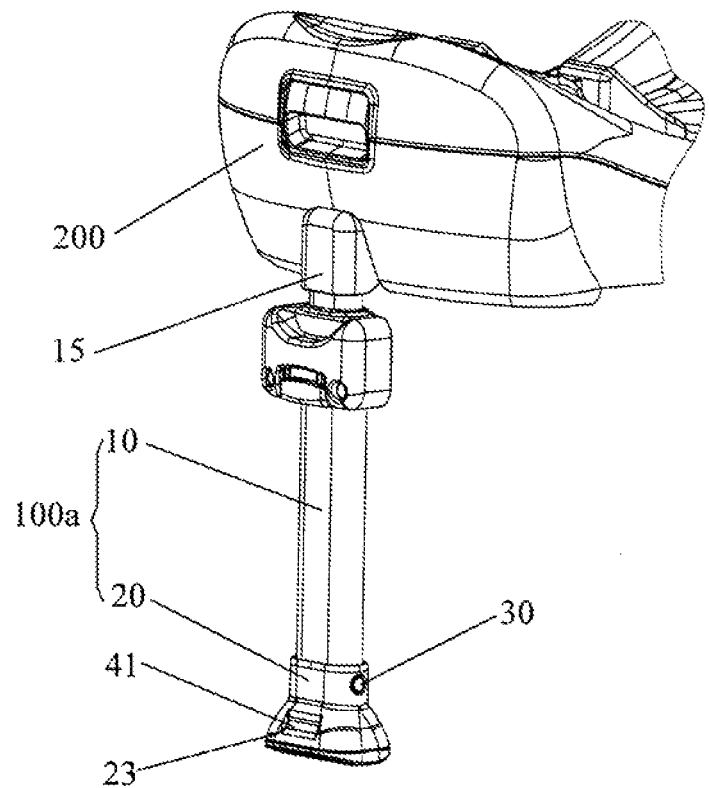
FIG. 1 is a perspective view illustrating an embodiment of a child safety seat.

When the support leg 100a is unfolded to a deployed state as shown in FIG. 1, the bottom of the foot portion 20 can rest in contact on a floor surface of the vehicle to provide support for the seat base 200. The lengthwise axis X of the deployed support leg 100a can lie substantially vertical relative to the floor surface. Owing to the contact against the floor surface, the lower end portion can be pushed upward by the floor surface so that the first region 41 is visible at the display window 23. The first region 41 can accordingly indicate that the support leg 100a is properly installed. In case the foot portion 20 of the support leg 100a does not properly contact the floor surface, the second region 42 can remain visible at the display window 23 to indicate that the support leg 100a is not properly deployed. In this manner, the caregiver can easily verify that the support leg 100a is properly installed.

When the support leg 100a is folded toward the seat base 200, the lower end portion is no longer pushed by the floor surface, and the spring 50 can bias the indicator member 40 to restore the initial position where the second region 42 is visible at the display window 23.

In a normal configuration of use, the support leg 100a can be unfolded to the deployed state as shown in FIG. 1 to abut against the floor of a vehicle. The support leg 100a can thereby provide support for the seat base 200. In this configuration, the fastener 30 is located at a first position through the hole 11 of the tubular segment 10 and the hole 21 of the foot portion 20.

When collision occurs, the energy of the collision is such that the tubular segment 10 is forced to move relative to the foot portion 20 (in particular the tubular segment 10 may be forced to move toward the foot portion 20), which causes the fastener 30 to break through the cushion portion 13 and move from the hole 11 to the hole 12 as shown in FIG. 5. While it travels from the hole 11 to the hole 12, the fastener 30 can be kept engaged through the hole 21 of the foot portion 20, such that the tubular segment 10 moves relative to the foot portion 20 between a first position where the fastener 30 is located in the hole 11 and a second position where the fastener 30 is located in the hole 12. The cushion portion 13 can thereby serve as a sacrificial portion that is broken by the fastener 30 to dissipate at least some of the collision energy applied to the support leg 100a.

Figure 7:
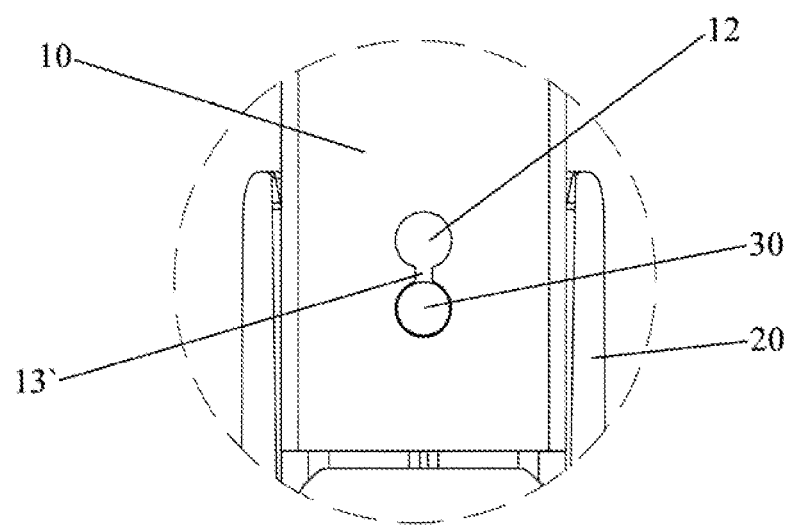
FIG. 7 is an enlarged view of portion A shown in FIG. 6.
Figure 8:
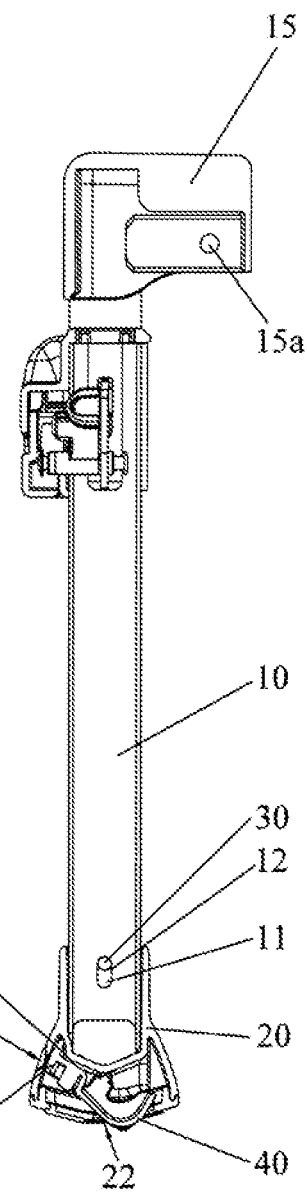
FIG. 8 is a schematic view illustrating the support leg of FIG. 6 when collision occurs.

FIGS. 6-8 are schematic views illustrating another embodiment of a support leg 100b assembled with the seat base 200. Compared to the support leg 100a described previously, the support leg 100b has a cushioning structure that includes a cushion portion having a narrow slot 13' that is interposed between the two holes 11 and 12. The cushion portion can be formed by a material portion of the tubular segment 10. The slot 13' cut through the cushion portion can extend parallel to the lengthwise axis X of the support leg 100b, and can connect with the holes 11 and 12. Moreover, the slot 13' can have a width that is smaller than the width of the fastener 30. Other parts of the support leg 100b may be similar to the support leg 100a described previously.

In a normal configuration of use, the tight engagement of the fastener 30 through the holes 21 and 11 can fixedly attach the tubular segment 10 with the foot portion 20, and the cushion portion can block displacement of the fastener 30 from the hole 11 to the hole 12. Relative displacement between the tubular segment 10 and the foot portion 20 can be thereby prevented.

When the support leg 100b is deployed to support the seat base 200 in a vehicle and collision occurs, the energy of the collision is such that the tubular segment 10 can be urged to move relative to the foot portion 20, which causes the fastener 30 to travel from the first hole 11 through the narrow slot 13' of the cushion portion to the second hole 12 as shown in FIG. 8. The travel of the fastener 30 through the slot 13' can cause material deformation of the cushion portion, which can thereby dissipate at least some of the collision energy applied to the support leg 100b.

Figure 10:
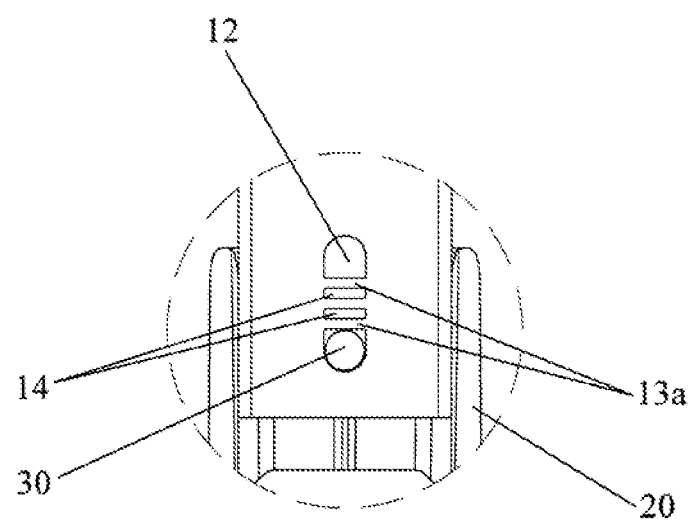
FIG. 10 is an enlarged view of portion B shown in FIG. 9.
Figure 11:
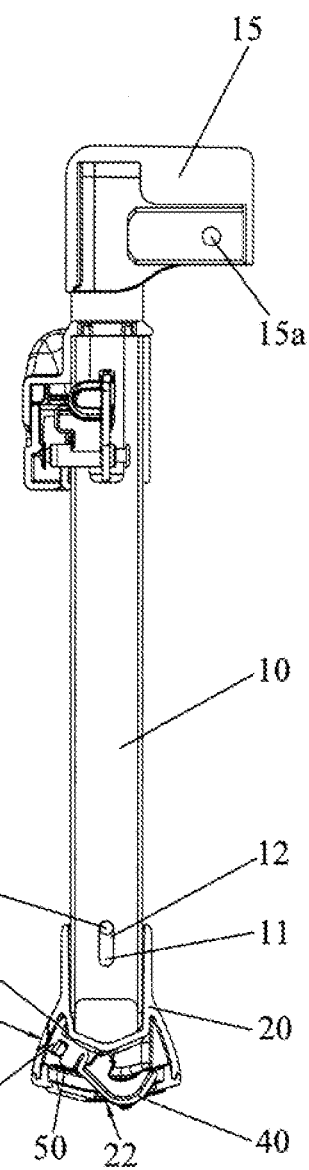
FIG. 11 is a schematic view illustrating the support leg of FIG. 9 when collision occurs.

FIGS. 9-11 are schematic views illustrating another embodiment of a support leg 100c assembled with the seat base 200. The support leg 100c has a cushioning structure that includes a plurality of ribs 13a that separate a plurality of slits 14 from one another. The ribs 13a and the slits 14 can be alternately disposed parallel to one another along the lengthwise axis X in the cushion portion between the two holes 11 and 12. The ribs 13a can be formed by a material portion of the tubular segment 10. Other parts of the support leg 100c may be similar to the support leg 100a described previously.

In a normal configuration of use, the tight engagement of the fastener 30 through the holes 21 and 11 can fixedly attach the tubular segment 10 with the foot portion 20, and one rib 13a adjacent to the hole 11 can block displacement of the fastener 30 from the hole 11 toward the hole 12. Relative displacement between the tubular segment 10 and the foot portion 20 can be thereby prevented.

When the support leg 100c is deployed to support the seat base 200 in a vehicle and collision occurs, the energy of the collision is such that the tubular segment 10 is forced to move relative to the foot portion 20, which causes the fastener 30 to break the ribs 13a and travel from the hole 11 to the hole 12 as shown in FIG. 11. While it moves toward the hole 12, the fastener 30 can be kept engaged through the hole 21 of the foot portion 20. The travel of the fastener 30 breaking the ribs 13a can dissipate at least some of the collision energy applied to the support leg 100c. It can be noted that when not all of the ribs 13a are broken (i.e., the fastener 30 does not reach the hole 12), the fastener 30 can abut against an unbroken rib 13a, which can provide support for the tubular segment 10.

Figure 13:
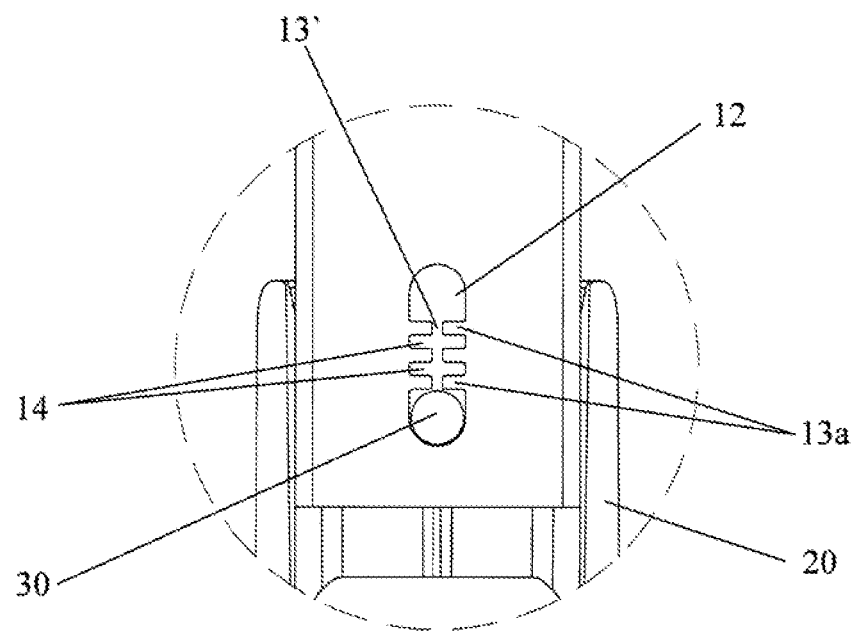
FIG. 13 is an enlarged view of portion C shown in FIG. 12.
Figure 14:
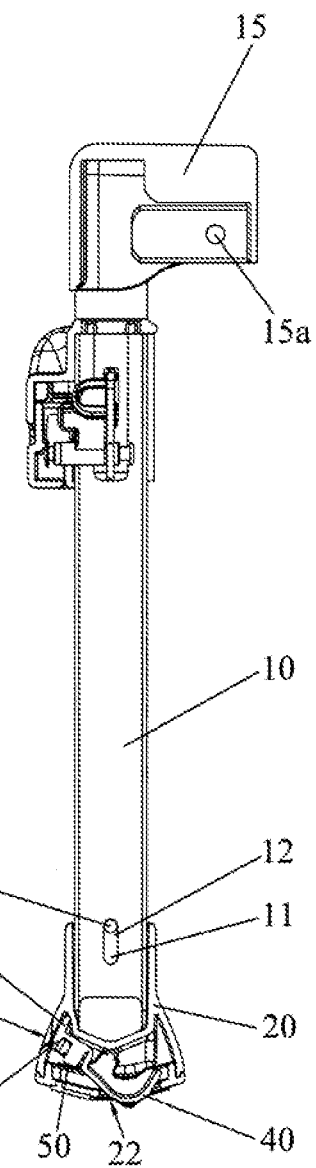
FIG. 14 is a schematic view illustrating the support leg of FIG. 12 when collision occurs.

FIGS. 12-14 are schematic views illustrating another variant embodiment of a support leg 100d assembled with the seat base 200. The support leg 100d can include a cushioning structure that can combine the embodiments shown in FIGS. 7 and 10. More specifically, the cushioning structure of the support leg 100d can include a plurality of ribs 13a that separate at least partially a plurality of slits 14 from one another. The ribs 13a and the slits 14 can be alternately disposed parallel to one another in the cushion portion delimited between the two holes 11 and 12. The ribs 13a can be formed by a material portion of the tubular segment 10. Each of the slits 14 can have a dimension along the lengthwise axis X that is smaller than the respective dimension of the first and second hole 11 and 12. Moreover, the cushioning structure of the support leg 100d can include a narrow slot 13' that connects with the holes 11 and 12 and cuts perpendicularly across the ribs 13a. Other parts of the support leg 100d may be similar to the leg structures described previously.

In a normal configuration of use, the tight engagement of the fastener 30 through the holes 21 and 11 can fixedly attach the tubular segment 10 with the foot portion 20, and one rib 13a adjacent to the hole 11 can block displacement of the fastener 30 from the hole 11 toward the hole 12. Relative displacement between the tubular segment 10 and the foot portion 20 can be thereby prevented.

When the support leg 100d is deployed to support the seat base 200 in a vehicle and collision occurs, the energy of the collision is such that the tubular segment 10 is forced to move relative to the foot portion 20, which causes the fastener 30 to travel along the slot 13' from the hole 11 to the hole 12 as shown in FIG. 14. The travel of the fastener 30 can cause material deformation of the ribs 13a, which can dissipate at least some of the collision energy applied to the support leg 100d.

The structures as described herein can provide rigid support for the infant seat base in a normal configuration of use. At least one advantage of the described structures includes the ability to provide a cushioning structure in the support leg that can dissipate at least some portion of the collision energy occurring during car accidents. Accordingly, less of the collision energy would be applied on the child's body to reduce the risk of injury, and dramatic rupture of the support leg can also be prevented. Therefore, the seat base can be safer in use.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
a seat base having a shell body;
a support leg connected with the shell body at a pivot connection, the support leg being rotatable relative to the shell body between a deployed position extending downward from the shell body for providing support, and a folded position close to the bottom of the shell body, wherein the support leg includes:
a tubular segment;
a support portion having a distal end capable of resting in contact against a floor of an automobile vehicle;
a fastener connected with the tubular segment and the support portion; and
a cushioning structure disposed adjacent to the fastener, wherein the cushioning structure is configured to block displacement of the fastener so that the support portion is locked in position relative to the tubular segment, and to deform or break as a result of a displacement of the fastener into the cushioning structure when a substantial force is applied that forces the tubular segment to move relative to the support portion.

2. The child safety seat according to claim 1, wherein the support portion is a foot portion affixed with a lower end of the tubular segment, and the support portion being in contact on a floor surface of an automobile vehicle when the child safety seat is installed in the automobile vehicle and the support leg is in a deployed state.

3. The child safety seat according to claim 2, wherein the tubular segment is fixedly assembled with the foot portion via the fastener.

4. The child safety seat according to claim 2, wherein the tubular segment includes a first and a second hole spaced apart from each other along a lengthwise axis of the support leg, the fastener is respectively engaged through a third hole of the foot portion and the first hole of the tubular segment, and the cushioning structure includes cushion portion disposed between the first and second hole.

5. The child safety seat according to claim 4, wherein the cushion portion is a material portion of the tubular segment located between the first and second hole.

6. The child safety seat according to claim 4, wherein the cushion portion includes a narrow slot that extends along the lengthwise axis of the support leg, and connects with the first and second holes.

7. The child safety seat according to claim 6, wherein the narrow slot has a width smaller than a width of the fastener.

8. The child safety seat according to claim 4, wherein the cushioning structure includes a plurality of ribs and one or more slit alternately disposed parallel to one another along the lengthwise axis in the cushion portion between the two first and second holes.

9. The child safety seat according to claim 8, wherein the cushioning structure further includes a narrow slot that connects with the first and second holes and cuts perpendicularly across the ribs.

10. The child safety seat according to claim 8, wherein the slit has a dimension along the lengthwise axis that is smaller than the second hole.

11. The child safety seat according to claim 1, wherein the fastener is a pin or a rivet.

12. The child safety seat according to claim 1, wherein the support portion is a foot portion affixed with a lower end of the tubular segment, and the foot portion includes a slot formed at a bottom thereof, and a display window formed at a side thereof, and the support leg further includes an indicator member movably connected with the foot portion and operable to indicate whether the support leg is folded or deployed against a floor of an automobile vehicle.

13. The child safety seat according to claim 1, wherein the tubular segment is sleeved into the support portion and the cushioning structure is positioned on the tubular segment.

14. The child safety seat according to claim 1, wherein the support portion is a rigid block configured to contact against a floor of an automobile vehicle.

15. A child safety seat comprising:
a seat base having a shell body;
a support leg connected with the shell body, wherein the support leg includes:
a tubular segment;
a support portion having a distal end surface capable of resting in contact against a floor of an automobile vehicle, the distal end surface having a slot;

a fastener connected with the tubular segment and the support portion; and a cushioning structure disposed adjacent to the fastener, the cushioning structure blocking displacement of the fastener so that the support portion is locked in position relative to the tubular segment, and the cushioning structure deforming or breaking as a result of a displacement of the fastener into the cushioning structure when a substantial force is applied that forces the tubular segment to move relative to the support portion; and an indicator member connected with the support portion and configured to indicate whether the support leg is properly installed against the floor of the automobile vehicle, wherein the indicator member extends outward through the slot when the distal end surface of the support portion is out of contact with the floor, and the indicator member displaces toward an interior of the support portion when the distal end surface rests in contact against the floor.

16. The child safety seat according to claim 15, wherein the indicator member is pivotally connected with the support portion.

17. The child safety seat according to claim 15, wherein the tubular segment includes a first and a second hole spaced apart from each other along a lengthwise axis of the support leg, the fastener is respectively engaged through a third hole of the foot portion and the first hole of the tubular segment, and the cushioning structure includes cushion portion disposed between the first and second holes.

18. The child safety seat according to claim 17, wherein the cushion portion is a material portion of the tubular segment located between the first and second hole.

19. The child safety seat according to claim 17, wherein the cushion portion includes a narrow slot that extends along the lengthwise axis of the support leg, and connects with the first and second holes.

20. The child safety seat according to claim 17, wherein the cushioning structure includes a plurality of ribs and one or more slit alternately disposed parallel to one another along the lengthwise axis in the cushion portion between the two first and second holes.

* * * * *